Patented June 18, 1940

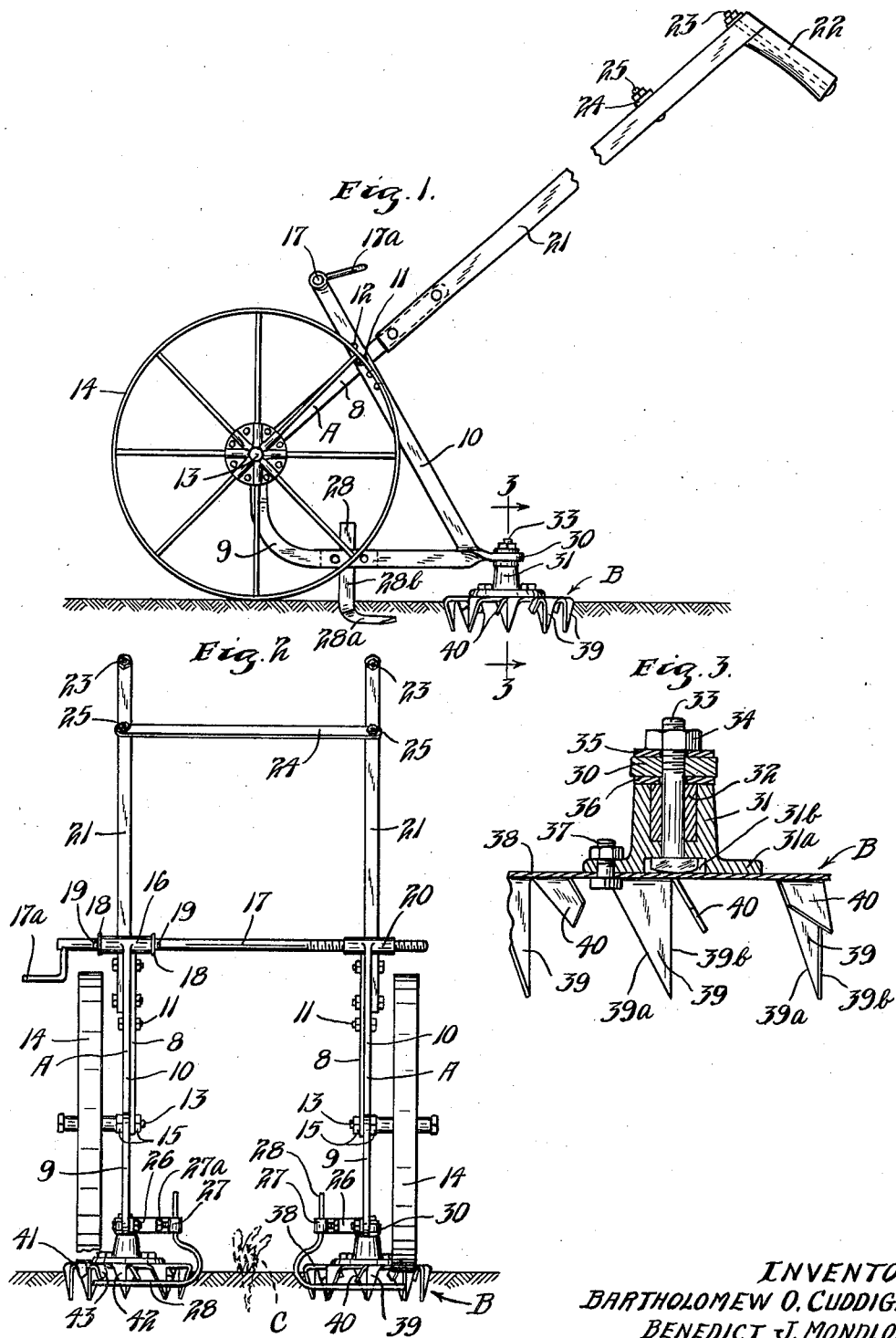

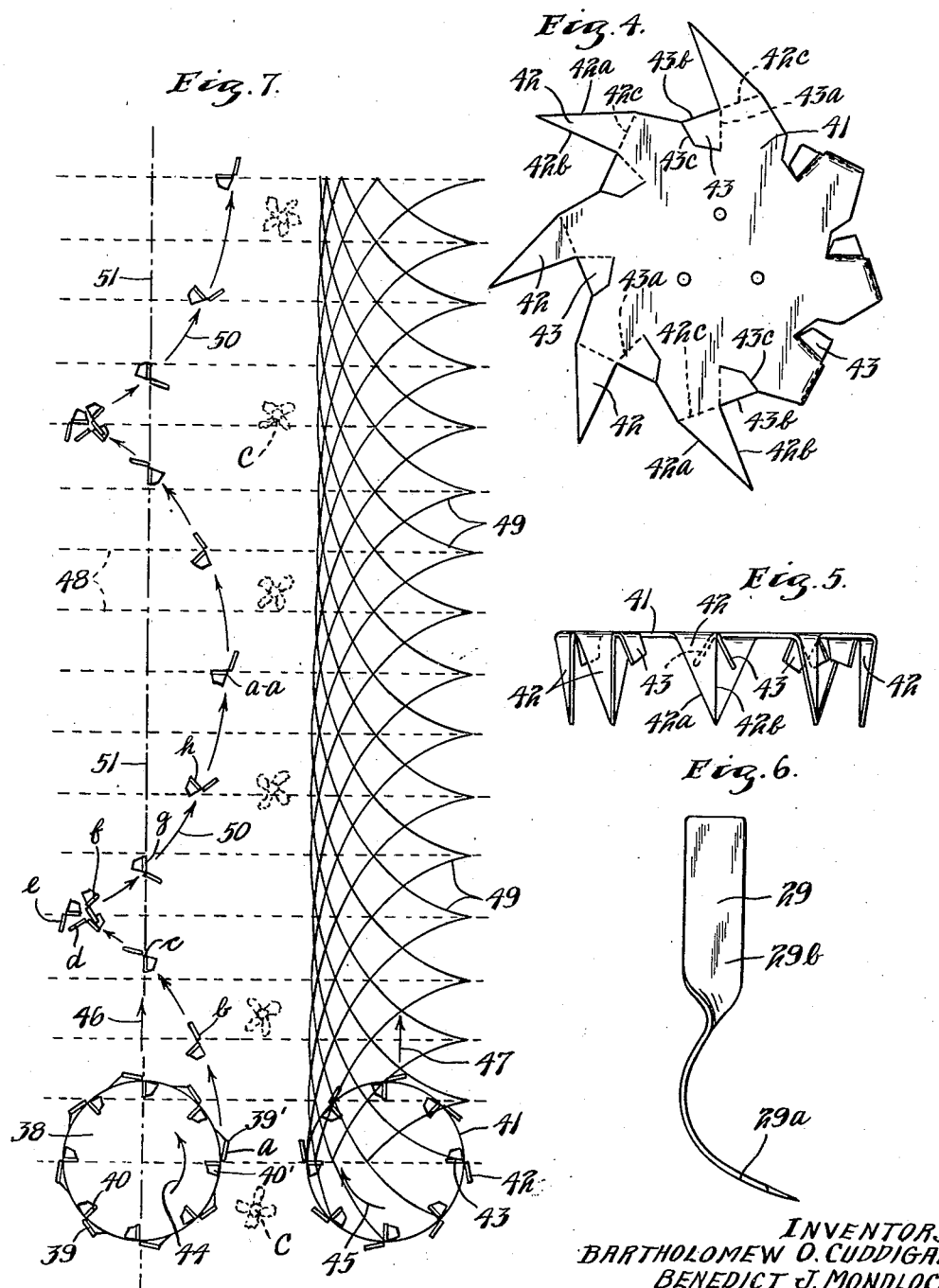

2,205,188

UNITED STATES PATENT OFFICE 2,205,188

CULTIVATOR

Bartholomew O. Cuddigan, Wadena, and Benedict J. Mondloch, St. Martin, Minn., assignors of one-sixth to said Cuddigan, one-sixth to said Mondloch, one-sixth to John Schaefer, St. Cloud, Minn., one-fourth to Joseph E. Murphy, Minneapolis, Minn., and one-fourth to A. J. Zachman, Robbinsdale, Minn.

Application March 23, 1938, Serial No. 197,690

10 Claims. (Cl. 97—59)

This invention relates to cultivators which, although adapted for other uses, are particularly adapted for use in cultivating row crops. In particular, the invention relates to cultivators of the general type disclosed in United States Patent No. 2,061,694 issued to Bartholomew O. Cuddigan on November 24, 1936, entitled "Cultivator", wherein rotary cultivator heads are employed carrying ground engaging teeth and wherein these heads are caused to rotate through engagement of the teeth in the ground as the cultivator is moved over the ground.

In the cultivator disclosed in the said Cuddigan Patent No. 2,061,694, pin-like ground engaging teeth are employed, attached to the rotary heads and the heads are caused to rotate by tilting the heads relative to the ground, whereby all the teeth do not penetrate at all times to the same depth into the ground. As the cultivator moves over the ground therefore, the ground is not cultivated to uniform depth below all points over which the outline of the cultivator heads pass. Also when the pin type teeth of the patented construction are employed, the path of each tooth through the soil loosens, breaks up and mulches but a small amount of the soil.

It is one of the main objects of the present invention to provide a cultivator including rotary heads carrying downwardly projecting teeth which can be caused to penetrate to uniform depth in the soil at all points below the outline of the heads and which teeth at the same time through their ground engagement will cause rotation of the heads to produce thorough pulverization of all portions of the soil over which the heads travel.

Another object is to provide teeth for such rotary heads that will work through the ground with a shearing-like cutting action.

Yet another object is to provide such a rotary head formed inexpensively from sheet metal and having teeth integrally connected therewith, so that the entire rotary head can be stamped.

Another object is to provide in such a rotary head having ground engaging teeth, auxiliary friction wings which will assist in causing rotation of the head.

One other object of the invention is to provide a cultivator including two wheeled frame sections, each of which carries a rotary head carrying ground engaging teeth and means for securely holding said frame sections in spaced relation while at the same time affording quick adjusting mechanism for varying the spacing between the frame sections to accommodate the cultivator to row crops of different sizes and ages of growth.

Yet another object is to provide a cultivator including two wheeled frame sections each carrying a rotary head provided with fixed ground engaging teeth and means for spacing the frame sections properly while permitting flexibility for movement of one rotary head upwardly and downwardly relative to the other in order that the two heads may readily accommodate themselves to different ground conditions that may exist at opposite sides of a row crop being cultivated.

The objects and advantages of the invention will more fully appear from the following description made in connection with the accompanying drawings, wherein like reference characters refer to the same or similar parts throughout the various views, and in which, Fig. 1 is a view in side elevation of a hand cultivator embodying the present invention showing the cultivator in the position it will assume relative to the ground when in normal use;

Fig. 2 is a view in front elevation of the same cultivator showing the manner in which it is used for cultivating a row crop;

Fig. 3 is a vertical section taken on the line 3—3 of Fig. 1 in enlarged scale and showing portions of one of the rotary heads;

Fig. 4 is a plan view of one of the combined disk and teeth stampings showing the manner of formation or pattern for the same, a number of the teeth and friction wings being turned down to the position they will assume upon complete formation;

Fig. 5 is a view in enlarged scale of one of the formed disks with teeth and wings in the properly bent position;

Fig. 6 is a view in side elevation of an alternate type of tool that can be used with the cultivator in advance of the rotary heads in place of tools of the type shown in Figs. 1 and 2; and Fig. 7 is a diagrammatic view illustrating at the right hand side thereof the ground action of the right hand rotary head during use in cultivating a row crop and illustrating at the left hand side thereof the different positions that one of the teeth and one of the wings will assume on the left hand rotary head during each 45° of rotation of the left hand rotary head.

Although most of the features of the present invention can be incorporated in hand cultivators, horse drawn cultivators or tractor cultivators, the invention is shown in the drawings as being embodied in a hand cultivator.

In accordance with the illustrated embodiment of the invention, there are provided two laterally spaced side frames designated as entireties by the letter A. Each side frame includes an upper diagonally inclined bar 8, a lower bar 9 of substantially ski-shape in side elevation and a rear brace bar 10. The rear brace bar 10 is preferably welded or otherwise secured to the rear portion of the bar 9 and inclines upwardly and forwardly to cross the bar 8 of the side frame near the rear and upper end of the bar 8. At the crossing point between the bar 8 and the bar 10 the two bars are interconnected adjustably by a nutted bolt 11 passing through a bolt hole in the bar 8 and through one of a series of spaced bolt holes 12 in the bar 10. The lower and forward end of the bar 8 and the upper and forward end of the bar 9 of each side frame A are apertured to receive an axle shaft 13 on which is mounted rotatably a ground engaging wheel 14. One of these ground engaging wheels 14 is located outwardly from each side frame A. The axle shaft 13 may consist merely of a bolt having a head at its outer end engaging the outer hub of the wheel 14 mounted thereon and the bolt may be secured to the adjacent bars 8 and 9 of the side frame as by opposed clamping nuts 15.

The upper end of one of the bars 10 carries a wide horizontal hub portion 16 through which a heavy screw rod 17 extends, washers 18 being carried by the screw rod 17 at either end of the hub 16 and being held in place as by cotter keys 19. The bar 10 of the opposite frame A also has at its upper end a heavy hub 20 which is internally screw-threaded to receive the screw-threaded portion adjacent one end of the screw rod 17. The opposite end of the screw rod is equipped with a crank-like handle 17a to permit the screw rod to be readily turned. It will be seen that by turning the screw rod 17 in one direction the two side frames A may be brought into more closely spaced relationship, while by turning the screw rod 17 in the opposite direction the spacing between the two side frames may be increased. Attention should also be called to the fact that the two hubs 16 and 20 with the screw rod 17 form a heavy cross brace between the two side frames A located at the upper ends of the side frames in well spaced relationship above the ground engaging surfaces of the wheels 14. Also it will be noted that with the construction employed, fore and aft tilting movement of one side frame relative to the other is permitted which is highly desirable for a purpose presently to appear.

Attached to the rear end portions of each side frame bar 8 is a cultivator handle 21 which runs upwardly and rearwardly therefrom and includes an angularly set hand grip 22 attached as by means of a nutted bolt 23. The upper portions of the two handles 21 are somewhat flexibly connected together by means of a light tie bar 24 secured as by rather loosely engaged nutted bolts 25 to the two handles. These bolts 25 will permit turning movement of the handles relative to the bar 24 to the slight degree necessary in order to permit variation in spacing between the two side frames A as the screw rod 17 is turned. Also this tie bar 24 has sufficient flexibility or spring to permit limited swinging movement fore and aft the cultivator of one side frame relative to the other about the axis of the screw rod 17.

Attached to the inner sides of the horizontal portions of the bars 9 about midway between the fore and rear ends of these bars are inwardly projecting arms 26 carrying vertical sockets 27 at their inner ends within which the shanks of such tools as the tools 28 or 29 are adapted to be received and held in desired vertical adjustment by means of set screws 27a carried by the sockets 27.

The tools 28 which are shown inserted in place in Figs. 1 and 2, have substantially horizontal cutting edges 28a joining the lower ends of shank 28b and the lower forward edges of the shanks are sharpened as are the edges of the horizontal portions 28a. Preferably the horizontal portions 28a slant outwardly and somewhat rearwardly from the shanks 28b. These tools 28 are made in rights and lefts. The tools 29 include curved teeth 29a which are sharpened and pointed at their lower ends to project well down into the ground and extend forwardly when the tools are in service. The shanks 29b of the tools 29 are twisted through 90° relative to the curved teeth 29a, as shown in Fig. 6.

Rearward of the juncture of the bars 10 of the side frames A with the bars 9, the bars 9 are twisted through 90° to form horizontal rearwardly projecting ears 30, each of which supports a rotary head designated as an entirety by the letter B. These heads B are made in rights and lefts for use at opposite sides of the machine so that one head will rotate in one direction, while the other head rotates in an opposite direction. Each head B includes a hub 31 having an outturned flange 31a at its lower end, having a bolt head receiving recess 31b of circular form formed in the central part of its lower end and having a central recess or well in its upper portion within which a bearing bushing 32 is received. A bolt 33 has its head received within the recess 31b and projects upwardly through the hub 31 and the bearing bushing 32 and passes through an opening in one of the lugs 30. This bolt carries a nut 34 at its upper end which bears against a washer 35 located above the lug 30, a similar washer 36 being employed between the lug 30 and the upper end of the hub 31. With this construction the hub 31 is mounted for free rotation on the bolt or pivot 33.

Secured as by bolts 37 to the flange 31a of the left hand hub 31, as illustrated in the drawings, is a rotary cultivator disk 38 having downturned teeth 39 and downturned friction wings 40 pressed therefrom. Similarly attached to the flange 31a of the right hand hub 31 is a rotary cultivator disk 41 having downturned teeth 42 and downturned friction wings 43 pressed therefrom. Both disks 38 and 41 are formed of flat sheet material and the pattern of the blank for both disks is similar as shown in Fig. 4. It is assumed, however, that the disk to be made from the pattern shown in Fig. 4 is the right hand disk 41 shown in the drawings, inasmuch as to better show the manner of formation of the teeth and wings some of the teeth 42 and wings 43 are bent down instead of up, as the pattern shown in Fig. 4 is viewed. The disk 41, teeth 42 and wings 43 may be thus described in detail and differences in the formation of the disk 38, teeth 39 and wings 40 may be thereafter pointed out.

The flat blank from which the disk 41 is made is of general circular shape. A plurality of triangularly-shaped teeth 42 are formed at regularly spaced intervals circumferentially of the disk. Each tooth 42 has a leading cutting edge 42a which inclines rearwardly relative to clockwise rotation of the disk as viewed in Fig. 4 at an angle of approximately 120° relative to a radius taken to the center of the disk from the point where the edge 42a strikes the disk proper. Each tooth 42 also includes a trailing edge 42b which inclines rearwardly relative to clockwise rotation of the disk, as the disk is similarly viewed, at an angle of approximately 160° relative to a radius taken through the center of the disk from a point where the edge 42b strikes the disk proper. These teeth 42 are bent downwardly from the general plane of the disk at right angles thereto along bend lines 42c shown as dotted lines in Fig. 4 and set at right angles to the trailing edges 42b of the teeth. This leaves each triangular tooth 42 extending downwardly in a plane at right angles to the general plane of the disk 41 with the trailing edge 42b of each tooth set normal to the general plane of the disk and with the leading edge 42a inclined downwardly and rearwardly somewhat relative to clockwise rotation of the disk, the direction in which the disk will turn as viewed in plan.

The friction wings 43 are of quadrilateral-shape bent downwardly along the dotted lines 43a extending radially of the disk 41. These wings include edges 43b and 43c which connect at an acute angle on each wing to form a rather blunt point. The wings 43 incline rearwardly and downwardly from the disk at approximately 60° angles relative to clockwise rotation of the disk as viewed in Fig. 4. It will also be noted that the bend lines 43a join the trailing edges 42b of the teeth 42.

While the pattern for the left hand disk 38 is similar to the pattern for the right hand disk 41, the teeth 39 and the wings 40 are bent in opposite directions from the plane of the sheet material from which the disk is stamped than are the teeth 42 and the wings 43 from the plane of the material from which the disk 41 is stamped. In other words, if the disk 38 was viewed in plan, it would be adapted for rotation in a counter-clockwise direction and the leading edges 39a of the teeth 39 would incline downwardly and rearwardly relative to the direction of rotation of the disk, while the trailing edges 39b of the teeth 39 would be set normal to the plane of the body of the disk and the friction wings 40 would incline downwardly and rearwardly relative to the direction of rotation of the disk. To make this clearer, if two sheets were provided patterned as shown in Fig. 4, at the left side thereof, and the right hand disk with the teeth 42 and wings 43 were to be formed from one of these sheets and the left hand disk with teeth 39 and wings 40 were to be formed from the other of the sheets, the teeth and wings for the right hand disk would be bent down and the teeth and wings for the left hand disk would be bent up.

In using the cultivator arranged as illustrated for cultivating a row crop consisting of the plants C, for example, the row will be straddled by the cultivator with the left hand wheel 14 and the left hand disk 38 at the left side of the row and the right hand wheel 14 and the right hand disk 41 at the right side of the row. By turning the screw rod 17 the spacing between the two side frames can be varied to cultivate as close to the row or as far away from the row as desired. The handles 22 will, of course, be grasped by the farmer and assuming that the tools 28 are employed, these tools together with the teeth and friction wings of the two disks will be forced into the ground while the cultivator is being pushed forward. The cultivator will assume approximately the position shown in Figs. 1 and 2 relative to the ground with the main plane of the disks 38 and 41 approximately horizontal or parallel to the ground. As the cultivator is pushed forwardly, the left hand disk will be caused to rotate in a counter-clockwise direction looking down on the disk and the right hand disk 41 will be caused to rotate in a clockwise direction. As slight fore and aft tilting movement of one side frame A relative to the other side frame A is possible about the axis of the screw rod 17, the cultivator will accommodate itself to the irregularities in the soil at the two sides of the row so that even and thorough cultivation is effected.

In Fig. 7 the action of the cultivator as it moves over the ground is portrayed. At the lower part of this view the two disks 38 and 41 with their teeth and wings 39 and 40 and 42 and 43 respectively are diagrammatically shown and the curved arrows 44 and 45 respectively indicate the direction in which the two disks will rotate, while the straight arrows 46 and 47 indicate the direction of movement of the cultivator itself. The dash lines 48 represent distances in a forward direction that the cultivator will advance during each 45° of rotational movement of the two disks. At the right hand side of Fig. 7, the various curved lines 49 indicate the general paths of the various teeth 42 of the right hand disk as these teeth move through the ground. At the left hand side of Fig. 7, there is depicted the various positions that a single one of the teeth 39' and the positions that a single friction wing 40' of the left hand disk 38 will assume at the end of each 45° of rotation of the left hand disk 38. The general path of movement of the tooth 39' and wing 40' through the ground is depicted by the line 50, while the path of movement of the center of the disk, about which the disk rotates as an axis is depicted by the arrow line 51.

Studying the movement of the one tooth 39' and the one wing 40' of the left hand disk 38, it will be seen that the said tooth and wing generally follow along a path of a number of half ellipses, the ends of which are connected together, the convex sides of said half ellipses facing the row of plants C. The tooth 39' and the wing 40' during the first 45° of rotational movement of the disk 38 advance rapidly in a forward direction from the position a of the said tooth and wing closest the row crop to the position indicated by the letter b. During this initial 45° of rotation of disk 38, the general plane of tooth 39' is closely in line with the direction of movement 50 of the tooth through the soil and very little resistance is thus offered to movement of the tooth through the soil. During the second 45° of rotation of the disk 38, the tooth 39' and wing 40' advance to the central position c and it will also be noted that as the tooth 39' moves from the position b to the position c, the plane of the tooth is generally in line with the direction of movement of the tooth 50 through the soil and, hence, but slight resistance is offered to this movement. From the position a to the position c the forward movement of the cultivator and the rotational movement of the disk cause the tooth 39' and the wing 40' to advance a relatively great distance in the soil while the tooth offers but little resistance to forward movement. During the next 45° of movement from the central position c to the position d the tooth 39' and wing 40' make but little forward progress through the soil because of the back rotation of this particular tooth and wing. During its movement from the position c to the position d the plane of the tooth 39' is thrown increasingly out of line with the line 50 of general movement of the tooth through the soil and, therefore, increased resistance is offered by the soil against the forward movement of the tooth. During the next 45° of rotation of the disk the tooth 39' and wing 40' move to the position e and advance extremely little. The general plane of the tooth from the position d to the position e is generally crosswise of the line of travel 50 and therefore the soil offers a great deal of resistance to advancing movement of the tooth. During the next 45° of rotation of the disk 38 the tooth 39' and wing 40' advance to the position f and again but slight forward progress is made. The tooth again is set practically crosswise to its line of movement 50 from the position e to the position f and thus the soil offers a great deal of resistance to forward movement. In reality from the position d to the position f the tooth 39' and the wing 40' have chiefly a pivotal movement and progress forwardly but extremely little. From the position f the tooth and wing during the next 45° rotation of the disk 38 advance forwardly to the position g and during this time the general plane of the tooth is generally crosswise to its direction of travel through the soil and thus the soil offers a great deal of resistance to forward movement. During the next 45° of rotation of the disk 38 the particular tooth and wing in which we are interested advance from the position g to the position h and considerable forward progress is made. While the tooth is not generally in line with the line 50 of movement from the position g to the position h, the tooth is so disposed that its general plane is more in line with its movement through the ground than is the case generally during the previous three 45° of rotation of the disk and while the soil offers some resistance to movement from the position g to the position h considerably less resistance is offered than in the movement from any of the positions c, d, e, and f to the next succeeding advance position. From the position h the tooth and wing advance during the next 45° of movement to the position a—a whereupon the cycle of movement is complete. From the position h to the position a—a the tooth makes a great deal of forward progress and but slight resistance is offered to this forward movement by the soil due to the fact that the plane of the tooth is close to the line 50 of forward movement. The points where the line 51 crosses the lines 48 indicate the various positions that the center of the disk will assume during each 45° of rotational movement.

It will be seen that whenever the tooth 39' is outwardly of the center line 51 relative to the row crop the general plane of the tooth by reason of its set is such that the soil offers considerable resistance to the passage of the tooth therethrough. Whenever the tooth is located inwardly of the center line 51 relative to the row crop, the general plane of the tooth by reason of its set is such that the soil will offer relatively light resistance to the passage of the tooth therethrough. A great deal more resistance is thus offered at any one time to the movement of all the teeth outwardly of the center line relative to the row crop than is offered to the movement of the teeth inwardly of the center line relative to the row crop and this difference in resistance outwardly and inwardly relative to axis of rotation of the disk is one main factor which causes the left hand disk 38 to turn in a counter-clockwise direction, as viewed in Fig. 7. For corresponding reasons, the set of the teeth on the right hand disk 41 causes this disk to be revolved in a clockwise direction.

Referring for a moment to the lines 49 at the right side of Fig. 7, it will be seen that when the teeth are in their position farthest away from the row crop, they will be working generally through hard soil not previously cultivated by other teeth while the teeth are set generally crosswise to their movement through the soil. On the other hand the teeth while working most closely adjacent the row will be working through soil which for the most part has been already worked through by other teeth and the set of the teeth when near the row is more generally in the direction of movement of the teeth through the soil. This further causes greater resistance to be offered to the movement of the teeth when in their outer positions than when in their inner positions and assists in causing the disks to rotate as indicated.

The friction wings 40 and 43 as they work into the ground act to supplement the action of the teeth 39 and 42 to cause rotation of the disks in the proper direction. The inclination of these friction wings 40 and 43 is such that they would offer so much resistance to rotational movement of the disks in the opposite directions than those indicated that improper rotation of the disks would be impossible.

As the cultivator moves over the ground, all the teeth 39 and 42 penetrate to the same depth in the ground because of the fact that the general plane of the disks is horizontal or parallel to the ground. Thus the ground is uniformly cultivated to the same depth at all points over which the disks pass. As the leading edges 42a and 39a of the teeth incline rearwardly while projecting downwardly, these edges produce a shearing cut as they work into the ground which assists materially in reducing the resistance to forward progress of the cultivator.

The cultivator can be used with or without the tools 28 or 29. When the tools 28 are used in combination with the rotary heads B, these tools act to cut weeds in advance of the action of the disks and the rotary action imparted to the soil by the disk pulverizes and breaks up the soil already undercut by the teeth 28. When the tools 29 are used in combination with the rotary heads B, these tools 29 permit air to get down into the soil which is broken up and pulverized subsequently by the rotary heads.

By provision of the screw rods 17 equipped with the crank handle 21 quick change in spacing between the rotary heads can be very conveniently made from time to time while in the field.

With the disks arranged as shown, the last movement of the soil is toward the row. It will be readily appreciated that the disk 38 which is shown in the drawings as being connected to the left hand hub 31 can be connected to the right hand hub 31, while similarly the disk 41 shown in the drawings as being connected to the right hand hub 31 can be transferred to the left hand hub 31 to cause a somewhat different cultivation of the row crop and a cultivation in such manner that the rear teeth move the soil away from the row.

It will be seen that a highly effective cultivator has been provided for use in cultivating row crops. The rotary heads can, of course, be employed with horse drawn cultivators and tractor cultivators, as well as with hand cultivators.

It will, of course, be understood that various changes may be made in the form, details, arrangement and proportions of the various parts without departing from the scope of the present invention which, generally stated, consists in the matter shown and described and set forth in the appended claims.

Attention should perhaps be called to the fact that the described construction of the teeth and friction wings make them self-clearing of weeds and dirt that might otherwise accumulate thereon. The cultivator of the invention has been actually demonstrated in use and has been found to be successful for the purposes intended.

What is claimed is:

1. A rotary head for cultivators including a substantially circular sheet metal disk and triangular-shaped teeth bent downwardly therefrom at right angles to the disk at circumferentially spaced points along lines set at angles relative to radii extending from the center of the disk, the advancing edges of said teeth being inclined downwardly and rearwardly from the disk relative to the direction of rotation of the disk.

2. The structure defined in claim 1, and the trailing edges of the teeth being substantially normal to the disk.

3. A rotary head for cultivators including a substantially circular disk, triangular-shaped teeth formed of sheet material carried by said disk and extending downwardly therefrom at circumferentially spaced intervals, the general planes of said teeth being set at angles relative to radii extending to the center of the disk, and friction wings projecting downwardly from said disk and of less length than said teeth to engage the ground and assist in causing rotation of the disk.

4. A rotary head for cultivators including a substantially circular sheet metal disk, triangular-shaped teeth bent downwardly therefrom at circumferentially spaced intervals at right angles to said disk along lines set at angles relative to radii extending from the center of the disk and ground engaging friction wings bent downwardly from said disk and inclined rearwardly relative to the direction of rotation of the disks.

5. A rotary head for cultivators including a substantially circular sheet metal disk mounted for rotation about a central axis, triangular-shaped teeth bent downwardly therefrom at right angles to said disk at circumferentially spaced intervals along lines set at angles relative to radii extending from the axis about which said disk may rotate, the leading edges of said teeth being inclined downwardly and rearwardly from the disk relative to the direction of rotation of the disk and friction wings bent downwardly from said disk at circumferentially spaced points along radial lines and inclined rearwardly from the disk relative to the rotation of the disk.

6. A cultivator having in combination a pair of spaced wheel equipped frames, a heavy screw rod extending between said frames in spaced relationship above the lower edges of said wheels, said screw rod having screw threaded connection with at least one of said frames and being rotatably mounted relative to the other frame, a pair of heads one of which is rotatably mounted on each frame in spaced relation and a plurality of teeth of greater width than thickness carried by each head and projecting downwardly therefrom at circumferentially spaced points, said teeth being set so that the general planes through the width of the teeth are disposed at angles relative to radii emanating from the axis of rotation of said head.

7. The structure defined in claim 6, and a pair of handles one of which is connected to each frame.

8. A cultivator having in combination a pair of wheel equipped frames, a pair of rotary heads mounted in spaced relationship one on each frame adjacent the rear ends of said frames, each head having a plurality of downwardly projecting ground engaging teeth, the teeth of said heads being of greater width than thickness and being set at circumferentially spaced points relative to the axes of rotation of said heads with the general planes of said teeth set at angles relative to radii taken from the centers of rotation of said heads, and a pair of ground working tools one of which is carried by each frame in advance of the head carried by that frame.

9. A cultivator having in combination a pair of wheel equipped frames, a pair of rotary heads mounted in spaced relationship one on each frame adjacent the rear ends of said frames, a plurality of downwardly projecting, soil working teeth carried by each of said heads, the teeth of said heads being of greater width than thickness and being set at circumferentially spaced points relative to the axes of rotation of said heads with the general planes of said teeth set at angles relative to radii taken from the centers of rotation of said heads, said teeth being shaped to have leading edges disposed at an angle to a horizontal plane for shearing action in soil worked by the teeth, and a pair of ground working tools one of which is carried by each frame in advance of the head carried by that frame.

10. A cultivator having in combination a pair of horizontally spaced frames equipped with wheels, a heavy screw rod extending between said frames in spaced relationship above the lower edges of said wheels, said screw rod having screw threaded connections with at least one of said frames and being rotatably mounted relative to the other frame, a pair of heads one of which is rotatably mounted on each of said frames in spaced relation, and a plurality of ground working teeth carried by each of said heads and projecting downwardly therefrom.

BARTHOLOMEW O. CUDDIGAN.
BENEDICT J. MONDLOCH.